United States Patent
Fitzpatrick et al.

(10) Patent No.: US 7,468,856 B2
(45) Date of Patent: Dec. 23, 2008

(54) ESTIMATION AND CONTROL OF HEAD FLY HEIGHT

(75) Inventors: Jim Fitzpatrick, Sudbury, MA (US);
Jihao Luo, Shrewsbury, MA (US);
Baoliang Zhang, El Toro, CA (US);
Jesse Speckhard, Douglas, MA (US);
Barry Henry, Shrewsbury, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/742,154

(22) Filed: Apr. 30, 2007

(65) Prior Publication Data
US 2007/0268612 A1    Nov. 22, 2007

Related U.S. Application Data

(60) Provisional application No. 60/747,598, filed on May 18, 2006, provisional application No. 60/747,636, filed on May 18, 2006.

(51) Int. Cl.
*G11B 21/02* (2006.01)
(52) U.S. Cl. ............................ 360/75; 360/31
(58) Field of Classification Search .................. None
See application file for complete search history.

(56) References Cited

U.S. PATENT DOCUMENTS

| | | | |
|---|---|---|---|
| 7,310,195 B1 * | 12/2007 | Schreck et al. ............... 360/75 |
| 2007/0195449 A1 * | 8/2007 | Feist et el. .................... 360/75 |
| 2007/0230020 A1 * | 10/2007 | Leis ............................. 360/75 |

\* cited by examiner

*Primary Examiner*—Jason C Olson
(74) *Attorney, Agent, or Firm*—Myers Bigel Sibley & Sajovec, P.A.

(57) ABSTRACT

Various embodiments are disclosed that control head fly height based on estimates of head fly height. The fly height clearance between the head and a data storage media is estimated. Heating of the head by a heater element is then regulated in response to the estimated fly height.

10 Claims, 5 Drawing Sheets

ESTIMATION AND CONTROL OF HEAD FLY HEIGHT

RELATED APPLICATION

This application claims the benefit of and priority to U.S. Provisional Patent Application No. 60/747,598, filed May 18, 2006, and to U.S. Provisional Patent Application No. 60/747,636, filed May 18, 2006, the disclosures of which are hereby incorporated herein by reference as if set forth in their entirety.

FIELD

The present invention generally relates to sensor clearance control and, more particularly, to controlling fly height of a read/write head in a data storage device.

BACKGROUND

Data storage devices, such as disk drives, allow host computers to store and retrieve large amounts of digital data in a fast and efficient manner. A typical disk drive includes a plurality of magnetic recording disks which are mounted to a rotatable hub of a spindle motor and rotated at a high speed. An array of read/write heads is disposed adjacent to data storage surfaces of the disks to transfer data between the disks and a host computer. The heads can be radially positioned over the disks by a rotary actuator and a closed loop servo system, and can fly in close proximity to the surfaces of the disks upon air bearings. The heads each typically contain a separate read element and write element.

Higher data storage density on the disks may be obtained by reading and writing data on narrower tracks on the disks and by maintaining a corresponding smaller fly height gap between the heads and the data storage surfaces. The fly height of a head can vary in response to air density changes in the disk drive, and in response to head temperature variations, such as while writing, which can affect the distance that the tip of the head protrudes therefrom (i.e., pole-tip protrusion). Some disk drives use a heater to controllably heat the head in order to vary the fly height of the head.

Maintaining the head fly height within an acceptable range is becoming increasingly more difficult as that range is reduced to obtain higher data storage densities. Operation outside the acceptable range may result in an unacceptable read/write bit error rate and/or undesirable contact between a head and a data storage surface and potential loss of data and/or damage to the data storage surface.

SUMMARY

Various embodiments are disclosed that control head fly height based on estimates of head fly height. The fly height clearance between the head and a data storage media is estimated in response to heater signal levels applied to a heater element to heat the head. Heating of the head by the heater element is then regulated in response to the estimated fly height.

DETAILED DESCRIPTION

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will convey the scope of the invention to those skilled in the art. The terminology used in the detailed description of the particular exemplary embodiments illustrated in the accompanying drawings is not intended to be limiting of the invention.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings. Like numbers refer to like elements throughout the description of the figures.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show what may be a primary direction of communication, it is to be understood that communication may occur in the opposite direction to the depicted arrows.

Figure 1:
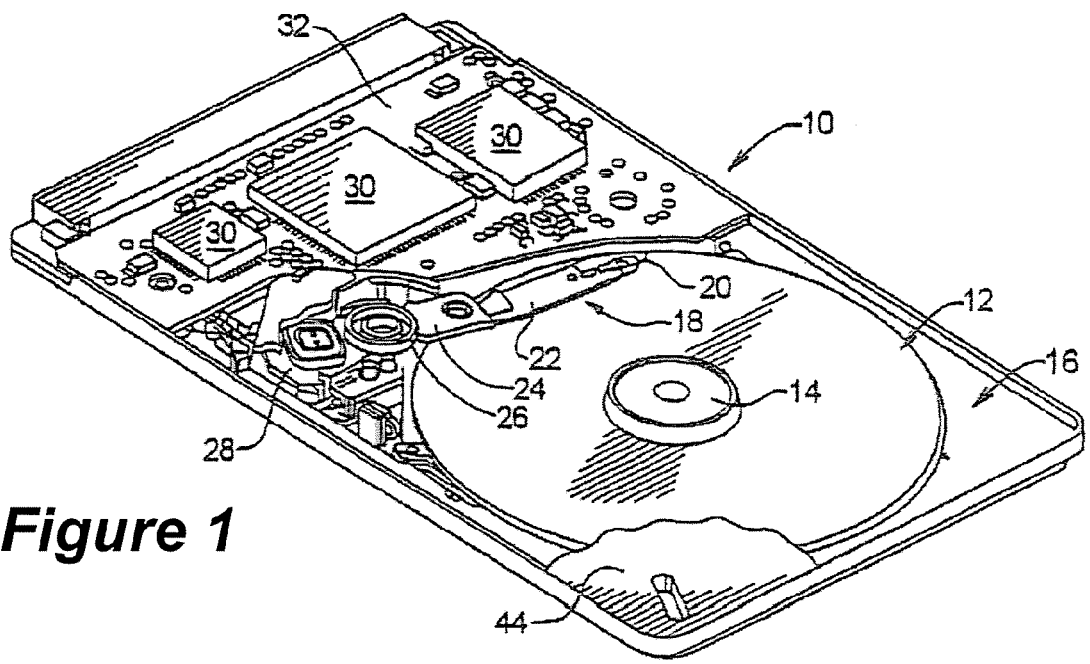
FIG. 1 is a perspective view of a disk drive with electronic circuits that are configured in accordance with some embodiments.
Figure 2:
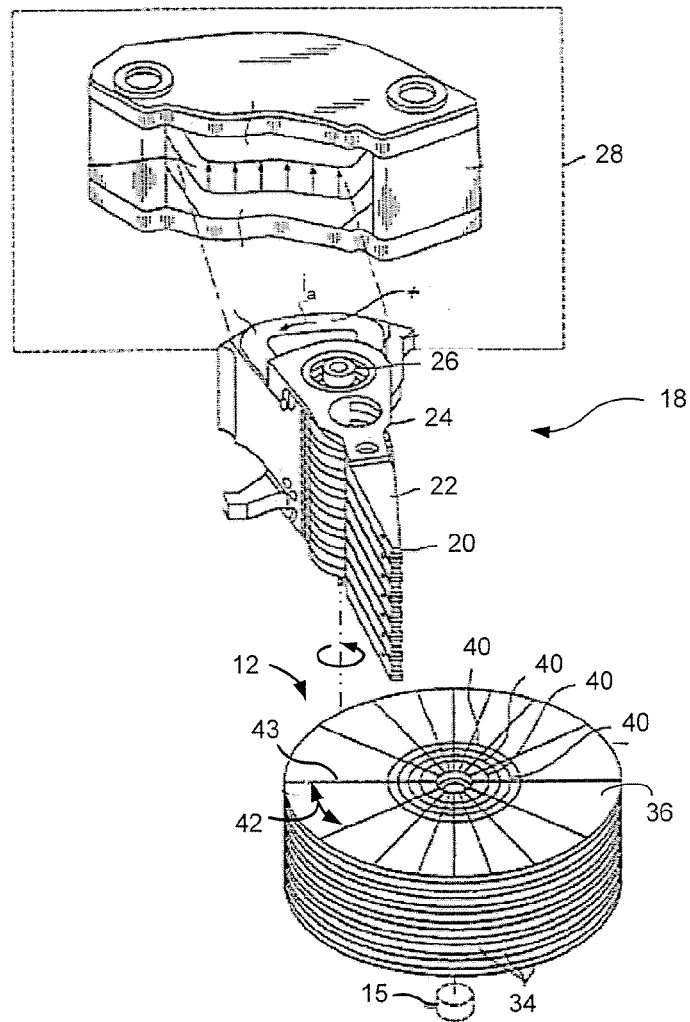
FIG. 2 is a block diagram of an exemplary head disk assembly of the disk drive.

A simplified diagrammatic representation of a disk drive, generally designated as 10, is illustrated in FIG. 1. The disk drive 10 includes a disk stack 12 (illustrated as a single disk in FIG. 1) that is rotated about a hub 14 by a spindle motor 15 (FIG. 2). The spindle motor 15 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 15.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks 40 and spokes 43 on the disks 34. Data is stored on the disks 34 within a number of concentric tracks 40 (or cylinders). Each track 40 is divided into a plurality of radially extending sectors 42 separated by radially extending spokes 43. Each sector is further divided into a servo sector and a data sector. The servo sectors of the disks 34 are used, among other things, to accurately position the head 20 so that data can be properly written onto and read from a selected one of the disks 34. The servo sectors may include a DC erase field, a preamble field, a servo address mark field, a track number field, a spoke number field, and a servo burst field (e.g., circumferentially staggered and radially offset A, B, C, D servo bursts). The data sectors are where data received as part of a host-initiated write command is stored, and where data can be read in response to a host-initiated read command.

Figure 3:
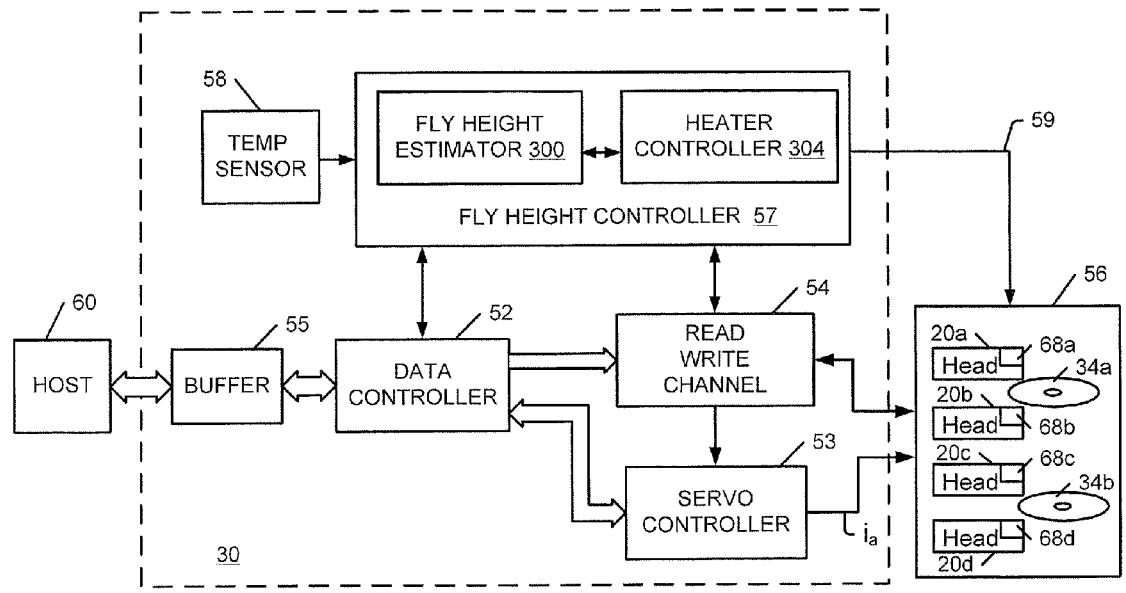
FIG. 3 is a block diagram of a portion of the controller of the disk drive shown in FIG. 1 and associated methods that are configured in accordance with some embodiments.

FIG. 3 is a block diagram of a host device 60 that is communicatively connected to a portion of the controller 30 of the disk drive 10 shown in FIG. 1 according to some embodiments. The controller 30 can include a data controller 52, a servo controller 53, a read write channel 54, a buffer 55, a fly height controller 57, and an air temperature sensor 58. Although the controllers 52, 53, and 57, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34a-b, a plurality of the heads 20a-d mounted to the actuator arm assembly 18 and positioned adjacent to different data storage surfaces of the disks 34a-b, the VCM 28, and the spindle motor 15. In general, there may be two heads 20 per disk 34. Thus, in a 4-disk platter drive, there may be eight heads 20.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form of a write current conducted through a selected head 20 in the HDA 56. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34, and to maintain the head 20 aligned with the track while data is written/read on the disk 34.

When a head 20 is selected for reading/writing, its fly height is typically above an acceptable flight height range where the head 20 should/must be located when reading/writing data on the disk 34. Accordingly, in response to selection of a head 20, the flight controller 57 heats the head 20 using a heater element to lower the head fly height to within the acceptable range. Upon reaching the acceptable range, reading/writing may be carried out through the selected head 20.

In accordance with some embodiments, the fly height controller 57 includes a fly height estimator 300 and a heater controller 304. The heater controller 304 controls heating by a heater element that heats the head 20. The fly height estimator 300 repetitively estimates the fly height of the head 20 relative to the disk 34 as data is written/read therefrom. The system regulates head heating by the heater controller 304 to drive the head 20 to within an acceptable fly height range and then attempts to maintain the head fly height within that range.

For example, in response to selection of the head 20 for writing, the fly height estimator 300 repetitively estimates head fly height as it regulates heating of the head to drive the fly height to within a range that is acceptable for writing. The fly height estimator 300 then continues to repetitively estimate head fly height and the fly height controller 304 regulates head heating, in response to the estimates, in an attempt to maintain head fly height within the acceptable range while the head 20 is writing data, which may include a sequence of writing groups of data blocks with gaps therebetween.

The heater controller 304 controls head fly height by regulating the power that is provided to a heater element that heats a selected head. With reference to FIG. 3, the HDA 56 may include a plurality of heater elements 68a-d attached, or otherwise thermally connected, to different ones of the heads 20a-d. The heater controller 304 generates heater signal 59 which is conducted through the heater elements 68a-d to generate heat therefrom and, thereby, heat the heads 20a-d. The heater controller 304 regulates the height adjustment signal 59 to control heating of the heads 20a-d and cause a controlled amount of pole-tip-protrusion (thermally-induced elastic deformation) from the heads 20a-d and, thereby, control fly heights of the heads 20a-d.

Although one heater signal 59 has been shown in FIG. 3, and which may be used to separately control heating by different ones of the heater elements 68a-d, it is to be understood that more heater signals 59 may be used to control the heater elements 68a-d and that, for example, the heater elements 68a-d may be controlled by individual heater signals 59.

As data is written, the head 20 is heated by the write current and its temperature can continue to rise to higher levels as the length of data (e.g., the number of blocks) that is written substantially continuously on the disk 34 increases. As head temperature increases, head fly height can decrease due to, for example, increasing head pole-tip-protrusion. When gaps occur between writes, the head 20 can cool, causing decreased pole-tip-protrusion and corresponding increase in fly height. Accordingly, the head 20 can be subjected to abrupt temperature fluctuations, which, if left uncompensated, may result in abrupt changes in fly height.

The fly height estimator 300 can estimate the fly height for a selected head 20 (e.g., 20a or another one of the heads 20b-d) in response to air temperature, which may be sensed by a temperature sensor 58, and/or in response to air pressure, which may be sensed by a pressure sensor. The fly height estimator 300 can also estimate fly height of the selected head 20a in response to a level of heating of the selected head 20a by the heater elements 68a, length of a data segment last written through the head 20a, and/or in response to write duty cycle (i.e., ratio of writing time to total time) for writing a plurality of data segments (e.g., a plurality of data blocks) through the head 20a with gaps therebetween.

The fly height estimator 300 may also compensate for the head heating that will occur in the future as planned writes are carried out. For example, the fly height estimator 300 may determine the length of one or more data segments in the buffer 55 that are about to be written on the disk 34, and may estimate the effect of such writing on head fly height and adjust the heater voltage in preparation for this change.

While data is being written/read, the fly height estimator 300 may generate a decreased fly height estimate in response to increased air temperature, increased heating by a heater element, and/or following writing of a longer data segment or increased write duty cycle (i.e., increased write power dissipation in the head 20 and associated increase in pole-tip-protrusion). Similarly, the fly height estimator 300 may generate an increased fly height estimate in response to decreased air temperature, decreased heating by the heater element, and/or increased gap between writes.

The fly height estimator 300 may periodically adjust (calibrate) its estimates of head fly height in response to fly height measurements carried out through the head 20a-d. The fly height measurements may be carried out by comparing the magnitude of a servo signal, which is generated by reading defined fields in the servo sectors using a selected head, to a known relationship between signal magnitude and head fly height.

Figure 4:
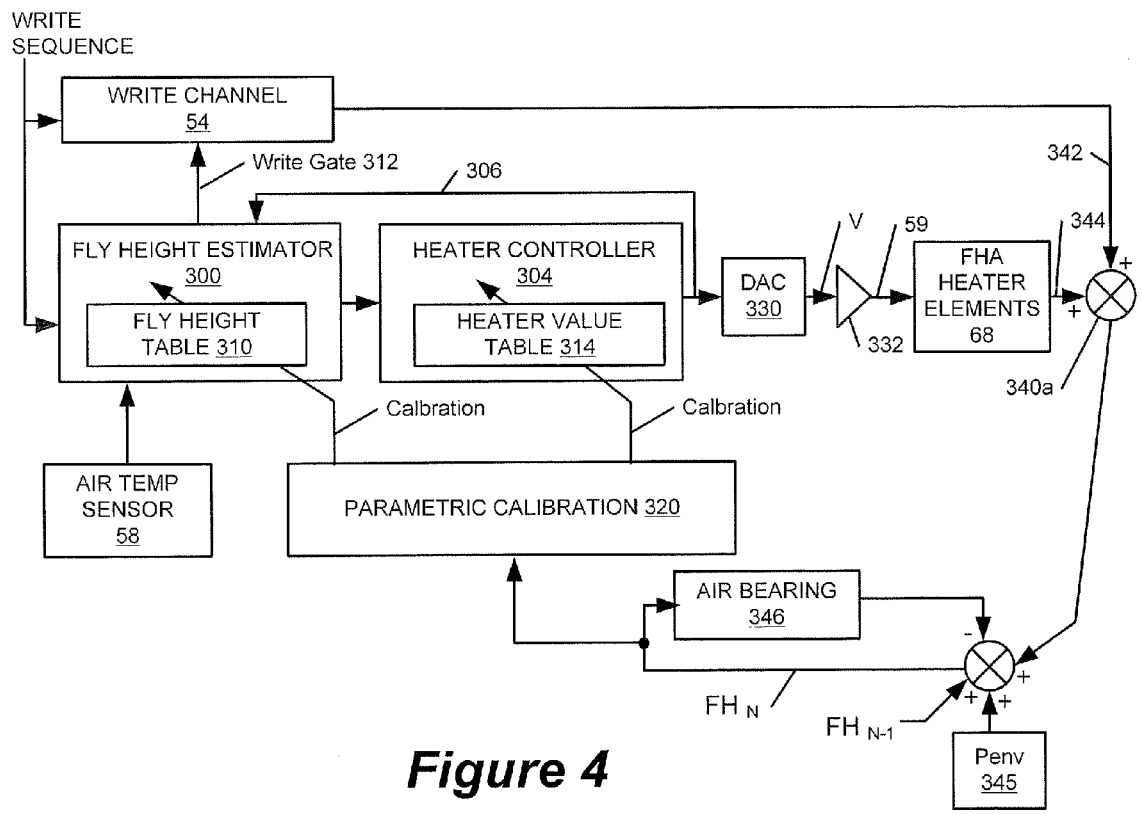
FIG. 4 is more detailed block diagram of the fly height controller of FIG. 3 and associated methods that are configured in accordance with some embodiments.

FIG. 4 is more detailed block diagram of the fly height controller 57 of FIG. 3 and associated methods that are configured in accordance with some embodiments. Referring to FIG. 4, the fly height estimator 300 can include a fly height table 310 of parametric values that define for each of the heads 20a-d an estimate of the head fly height when the head is subjected to a defined air temperature and/or air pressure, subjected to a level of heating from a corresponding one of the heater elements 68a-d, and/or subjected to a level of heating from writing a data segment having a defined length and/or writing at a certain duty cycle.

The parametric values of the fly height table 310 may be defined during the design of the disk drive 10 and/or may be calibrated during factory testing of the disk drive 10, the operations by which are collectively identified as parametric calibration 320. For example, the fly heights of the heads 20a-d may be individually measured during factory testing while the heads 20a-d are subjected to a range of air temperatures, subjected to a range of heating levels by the heater elements 68a-d, and/or subjected to a range of write current durations and/or write duty cycles. The fly height table 310 may be further calibrated during operation of the disk drive 10 in response to fly height measurements, such as described above by reading defined fields in the servo sectors or elsewhere on the disks 34a-b.

The fly height estimate by the fly height estimator 300 may be generated based on a combination of intermediate estimates, such as an estimate of head fly height at a sensed air temperature combined with an estimate of head pole-tip-protrusion from head heating by the heater element 68 and an estimate of head pole-tip-protrusion from writing data. The head fly height relative to a disk 34 may be determined by subtracting the summed estimates of head pole-tip-protrusion, due to heater element heating and head writing, from the estimate of head fly height at a particular air temperature (i.e., head pole-tip-protrusion decreases the head fly height gap at a particular air temperature).

For example, pole-tip-protrusion distance due to head heating while writing data may be repetitively estimated over a time increment k based on the following Equation 1:

$$PTP_W(k) = A_1(\alpha_1(1-e^{(-kT/\tau 1)}) + (1-\alpha_1)(1-e^{(-kT/\tau 2)})), \quad \text{(Equation 1)}$$

where $PTP_W(k)$ represents the writing-induced head pole-tip-protrusion distance at time increment k, T represents a servo spoke location of the head 20, $A_1$ represents a calibrated amplitude of pole-tip-protrusion over an operable range of writing-induced heating, $\alpha_1$ represents a gain factor, and $\tau_1$ and $\tau_2$ are calibrated time constants that are indicative of the rate of change of pole-tip-protrusion in response to writing data through the head.

The pole-tip-protrusion distance due to head heating by the heater element 68 may be repetitively estimated over the time increment k based on the following Equation 2:

$$PTP_H(k) = A_2(\alpha_2(1-e^{(-kT/\tau 3)}) + (1-\alpha_2)(1-e^{(-kT/\tau 4)})), \quad \text{(Equation 2)}$$

where $PTP_H(k)$ represents the heater-induced head pole-tip-protrusion distance at time increment k, T represents a servo spoke location of the head 20, $A_2$ represents a calibrated amplitude of pole-tip-protrusion over an operable range of heating by the heater element, $\alpha_2$ represents a gain factor, and $\tau_3$ and $\tau_4$ are calibrated time constants that are indicative of the rate of change of pole-tip-protrusion in response to a heater signal applied to the heater element.

The time increment k at which the fly height estimates are updated may or may not correspond to an integer multiple of the servo spoke timing sensed by the read write channel 54. The length of the time increment k may be defined based on the rate of change of head fly height that the fly height estimator 300 is to track with its fly height estimates. Accordingly, the time increment k may be decreased (i.e., higher frequency of estimates) to, for example, track faster head temperature variations.

Accordingly, fly height estimator 300 utilizes the fly height table 310 to dynamically estimate head fly height in response to present air temperature, level of heating by the heater element 68 (e.g., heater signal 306), length(s) of written data segment, and/or length of one or more upcoming writes. The fly height estimator 300 uses the fly height estimates to regulate heating by the heater controller 304 in an attempt to maintain the fly height of a selected head within an acceptable range. The fly height estimator 300 may also selectively inhibit writing by the write channel 54, via a write gate signal 312, when the estimated fly height is outside the acceptable range.

The heater controller 304 can include a heater value table 314 (or other controller logic or controller algorithm) that translates the fly height estimates from the fly height estimator 300 into digital heater values 306. The digital heater values 306 are converted by a digital-to-analog converter (DAC) 330 into an analog voltage that is amplified by an amplifier 332 to generate a heater signal 59 that may be selectively conducted to one of the fly height adjust (FHA) heater elements 68a-d for a selected one of the heads 20a-d.

In FIG. 4, the fly height of a selected head depends upon the cumulative effects at summing node 340a of head heating by the write current 342 and the heat output 344 of the heater element. The fly height of the selected head also depends upon parameters which are not controlled by the fly height estimator 300, including environmental conditions Penv 345, such as air temperature, the configuration of the slider portion of the head 20 which generates the air bearing 346, and the previous state of head fly height (indicated as $FH_{N-1}$) relative to a current state of head fly height (indicated as $FH_N$).

Figure 5:
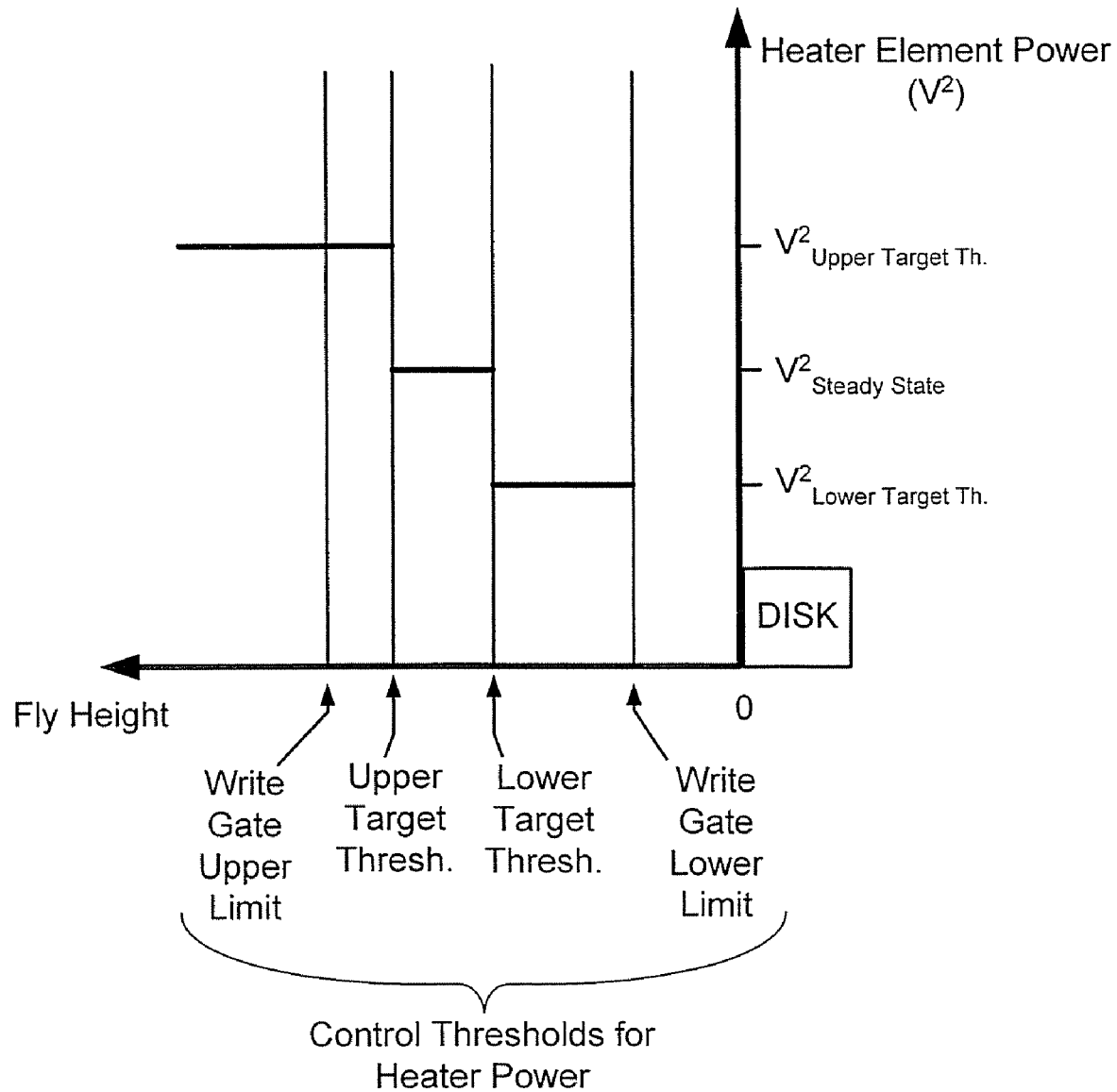
FIG. 5 shows a graph that illustrates methods and operation of the fly height controller of FIGS. 3 and 4 for regulating heater element power to attempt to obtain and maintain head fly height clearance within an acceptable range.

FIG. 5 is a graph that illustrates a typical example of methods and operation of the fly height estimator 300 and the heater controller 304 of the fly height controller 57 of FIGS. 3 and 4 for regulating heater element power to obtain and maintain head fly height within an acceptable range. Referring to FIGS. 4 and 5, the fly height estimator 300 may regulate head heating by the heater element 68, i.e., regulate heater element power ($V^2$), based on a comparison of the estimated head fly height to various defined control threshold levels. When the estimated fly height is above a defined write gate upper limit, the fly height estimator 300 asserts the write gate 312 to prevent data from being written via the write channel 54 through the head 20. When the estimated fly height is above an upper target threshold (e.g., an upper bound of the fly height range of the head 20 while writing/reading), the fly height estimator 300 commands the heater controller 304 to generate an upper heater power level $V^2$ ("$V^2_{Upper\ Target\ Threshold}$") through the heater element 68, which is calibrated to decrease head fly height to below the upper target threshold.

When the estimated head fly height decreases below the write gate upper limit, the fly height estimator 300 de-asserts the write gate 312 to allow data to be written through the write channel 54 and the head 20. As explained above, the head 20 is heated as data is written through it, and its fly height can decrease as the pole-tip-protrusion therefrom increases. While the estimated head fly height is between the upper and lower target thresholds, the fly height estimator 300 commands the fly height controller 304 to generate a steady state level ("$V^2_{Steady\ State}$") of heater power. The steady state level ("$V^2_{Steady\ State}$") of heater power is calibrated to be a level that should maintain head fly height between the upper and lower target thresholds. The steady state level ("$V^2_{Steady\ State}$") is less than the upper heater power level $V^2$ ("$V^2_{Upper\ Target\ Threshold}$").

When the estimated head fly height falls below the lower target threshold, the fly height estimator 300 commands the fly height controller 304 to further reduce the heater power level $V^2$ to a lower heater power level $V^2$ ("$V^2_{Lower\ Target\ Threshold}$") through the heater element 68. The lower heater power level $V^2$ ("$V^2_{Lower\ Target\ Threshold}$") is calibrated so as to attempt to cause the head 20 to sufficiently cool so that fly height increases and returns to between the upper and lower target thresholds. The lower heater power level $V^2$ ("$V^2_{Lower\ Target\ Threshold}$") is less than the steady state level ("$V^2_{Steady\ State}$").

When the estimated head fly height falls below the write gate lower limit, the fly height estimator 300 asserts the write gate 312 to prevent data from being written via the write channel 54 through the head 20. With writing inhibited, the head 20 may sufficiently cool so that its estimated fly height increases sufficiently above the write gate lower limit so that the write gate can be de-asserted and writing may resume.

Under a normal working condition, the upper target threshold, the lower target threshold, the $V^2_{Lower\ Target\ Threshold}$, $V^2_{Upper\ Target\ Threshold}$, and the $V^2_{Steady\ State}$ are arranged so that the fly height stays within the range defined between the write gate upper limit and the write gate lower limit. By properly selecting these values, the fly height actuator disables reading/writing only during the initial selection of the target head and changes to the fly height target, which may reduce/minimize the possible impact on disk drive performance by the fly height estimator/controller architecture.

Figure 6:
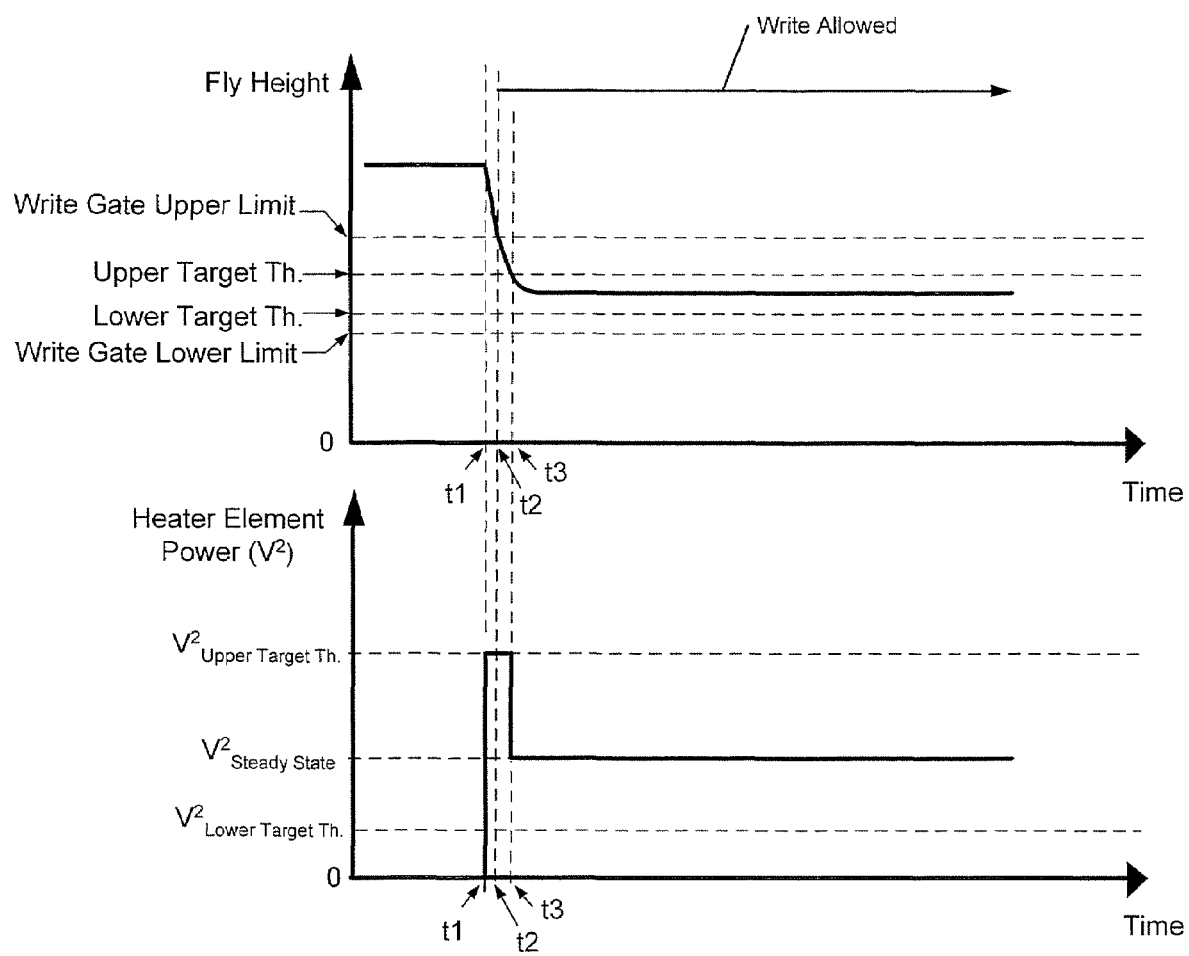
FIG. 6 shows two graphs that illustrate further methods and operation of the fly height controller of FIGS. 3 and 4 for regulating heater element power to attempt to obtain and maintain head fly height clearance within an acceptable range without data writing events.

FIG. 6 shows two graphs that illustrate further methods and operation of the fly height estimator 300 and heater controller 304 of the fly height controller 57 of FIGS. 3 and 4 for regulating heater element power to obtain and maintain head fly height clearance within an acceptable range. Referring to FIG. 6, when the head 20 is selected, it initially has a fly height that is above the write gate upper limit and, consequently, the fly height estimator 300 asserts the write gate 312 to prevent data from being written through the selected head 20 while the head is flying too high.

To prepare for writing, the fly height estimator 300 causes the heater controller 304 to supply the upper heater power level $V^2$ ("$V^2_{Upper\ Target\ Threshold}$") to rapidly heat the head 20 and cause its fly height to rapidly drop below the write gate upper limit. In response to the estimated fly height falling below the write gate upper limit at time t2, the fly height estimator 300 de-asserts the write gate 312 thereby allowing writing to begin. By rapidly heating the head 20 when the head fly height is above the write gate upper limit, the head fly height may be rapidly driven below the write gate upper limit and, thereby, allow writing to more quickly begin following selection of the head 20.

Although the exemplary flight control illustrated in FIG. 6 has been described in the context of writing, it is not limited thereto, as it may additionally or alternatively be carried out to control fly height while reading data.

Figure 7:
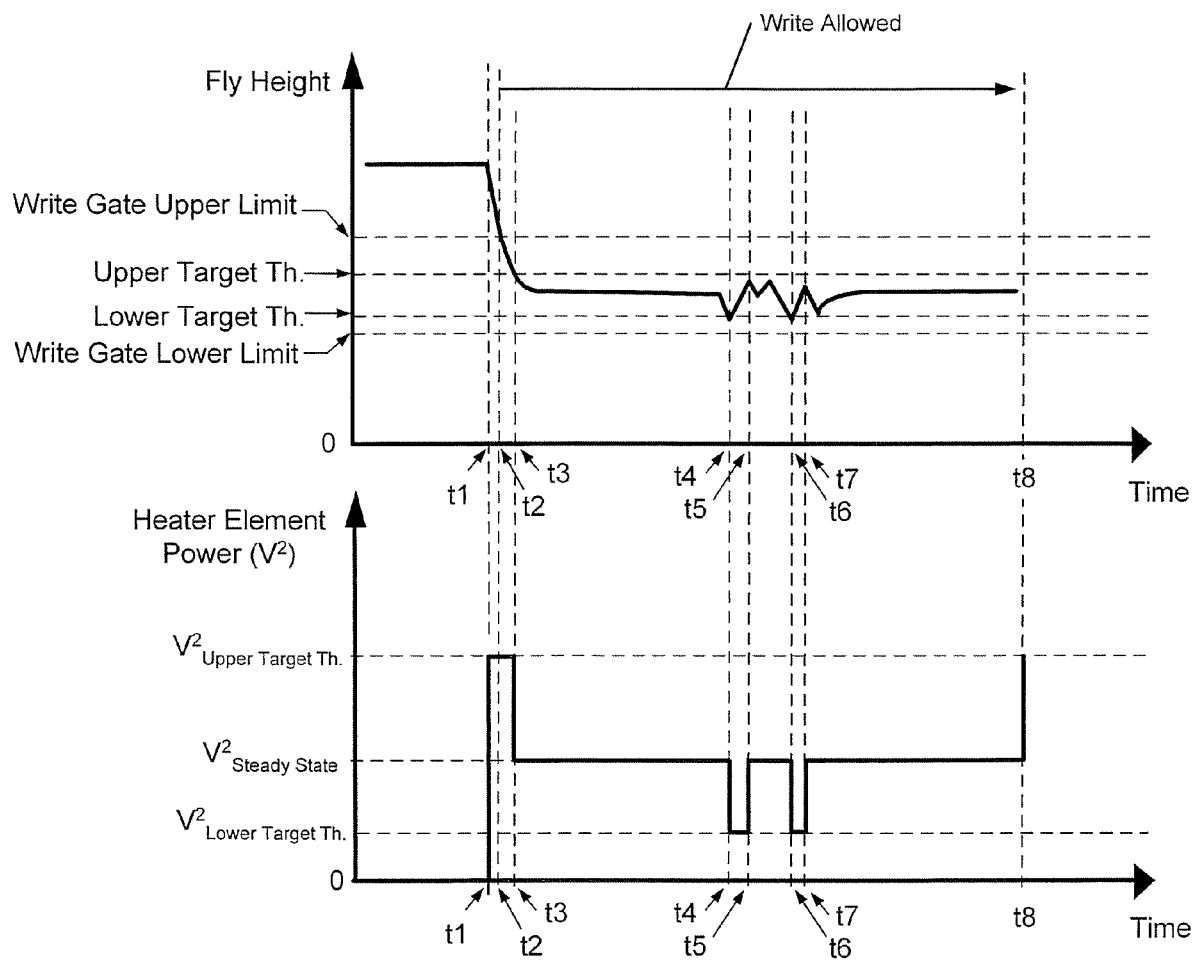
FIG. 7 shows two graphs that illustrate further methods and operation of the fly height controller of FIGS. 3 and 4 for regulating heater element power to attempt to obtain and maintain head fly height clearance within an acceptable range with data writing events.

FIG. 7 shows two graphs that illustrate further methods and operation of the fly height estimator 300 and heater controller 304 of the fly height controller 57 of FIGS. 3 and 4 for regulating heater element power to obtain and maintain head fly height clearance within an acceptable range. FIG. 7 differs from FIG. 6 in that a sequence of data writes are carried out with gaps therebetween and which sufficiently heat the head 20 to cause its fly height to repeatedly drop below the lower target threshold.

Referring to FIG. 7, when the head 20 is selected for writing at time t1, the head 20 initially has an estimated fly height that is above the write gate upper limit and, consequently, the fly height estimator 300 asserts the write gate 312 and causes the heater controller 304 to supply the upper heater power level $V^2$ ("$V^2_{Upper\ Target\ Threshold}$") to cause the head fly height to rapidly drop below the write gate upper limit. In response to the estimated fly height falling below the write gate upper limit at time t2, the fly height estimator 300 de-asserts the write gate 312 thereby allowing writing to begin. As data is written, the head temperature rapidly increases and the fly height may correspondingly decreases below the upper target threshold at time t3, and, in response, the fly height estimator 300 causes the heater controller 304 to reduce the heater element power to the steady state level ("$V^2_{Steady\ State}$"). With the steady state level of heater element power, the head fly height fluctuates as data segments are intermittently written with gaps therebetween The estimated head fly height falls below the lower target threshold at time t4. In response to the estimated fly height becoming below the lower target threshold, the fly height estimator 300 causes the heater controller 304 to reduce the heater element power to the lower heater power level $V^2$ ("$V^2_{Lower\ Target\ Threshold}$"). The fly height estimator 300 causes the heater controller 304 to increase the heater element power to the steady state level ("$V^2_{Steady\ State}$") at time t5.

The estimated head fly height again falls below the lower target threshold at time t6. In response to the estimated fly height becoming below the lower target threshold, the fly height estimator 300 causes the heater controller 304 to reduce the heater element power to the lower heater power level $V^2$ ("$V^2_{Lower\ Target\ Threshold}$"). The fly height estimator 300 causes the heater controller 304 to increase the heater element power to the steady state level ("$V^2_{Steady\ State}$") at time t7.

Although not shown, if the head fly height had fallen below the write gate lower limit, the fly height estimator 300 would have asserted the write gate 312 to prevent data from being written through the head 20, which may allow the head 20 to sufficiently cool so that its fly height may rise above the write gate lower limit where writing may resume.

The write gate lower limit feature protects the head disk interface when, for example, the fly height actuation back-off capability is not sufficient to compensate for a long write event and/or when writing pole-tip protrusion occurs faster than can be compensated for by the fly height actuation. Although some embodiments have been described in the context of enabling/disabling write gate using estimated fly during writes, the invention is not limited thereto. Indeed, in accordance with various other embodiments, reading can be enabled and disabled in response to comparison of present fly height with a read gate window(s) defined between various threshold values. Moreover, controlling a read gate may be simpler than controlling a write gate because the fly height estimation while reading does not use an estimate of write induced pole tip protrusion.

Although some embodiments the fly height controller 57 have been described in the context of controlling head fly height in response to comparisons of estimated fly height to a plurality of discrete threshold values (e.g., upper target threshold and lower target threshold) and regulating heater element power between a plurality of discrete levels (e.g., $V^2_{Upper\ Target\ Threshold}$, $V^2_{Steady\ State}$, and $V^2_{Lower\ Target\ Threshold}$), the fly height controller 57 is not limited thereto. The fly height controller 57 may instead regulate heater element power across any number of intermediate values, within a range of heater power levels, in response to the estimated fly heights. Thus, for example, the fly height controller 57 may more continuously regulate the heater element power between zero and, for example, the upper heater power level $V^2$ ("$V^2_{Upper\ Target\ Threshold}$") such that the stepwise changes illustrated in FIGS. 6 and 7 are replaced by a plurality of smaller steps and/or continuous transitions, such as along a polynomial curve, within the defined range.

In the drawings and specification, there have been disclosed typical preferred embodiments and, although specific terms are employed, they are used in a generic and descriptive sense only and not for purposes of limitation, the scope being set forth in the following claims.

What is claimed is:

1. A method of controlling head fly height comprising:
estimating fly height clearance between a head and a data storage media in response to heater signal levels applied to a heater element to heat the head;
generating a repository of calibrated fly height values for a range of heater signal levels applied to the heater element to heat the head and for a range of ambient air temperatures, wherein the fly height is estimated in response to the repository of calibrated fly height values, a present level of the heater signal applied to the heater element, and a present air temperature; and
regulating heating of the head by the heater element in response to the estimated fly height.

2. The method of claim 1, wherein:
the fly height clearance is further estimated based on a combination of an estimate of head fly height at a sensed air temperature, an estimate of head pole-tip-protrusion from head heating from writing data, and an estimate of head pole-tip-protrusion from head heating by the heater element;
the estimate of head pole-tip-protrusion from head heating from writing data is based on the following equation:

$PTP_W(k) = A_1(\alpha_1(1-e^{(-kT/\tau_1)}) + (1-\alpha_1)(1-e^{(-kT/\tau_2)}))$, where $PTP_W(k)$ represents the head pole-tip-protrusion at time k, T represents a servo spoke location of the head, $A_1$ represents amplitude of pole-tip-protrusion over an operable range of writing-induced heating, $\alpha_1$ represents a gain factor, and $\tau_1$ and $\tau_2$ are time constants indicative of the rate of change of pole-tip-protrusion in response to writing data through the head; and
the estimate of head pole-tip-protrusion from head heating by the heater element is based on the following equation:

$PTP_H(k) = A_2(\alpha_2(1-e^{(-kT/\tau_3)}) + (1-\alpha_2)(1-e^{(-kT/\tau_4)}))$, where $PTP_H(k)$ represents the head pole-tip-protrusion at time k, T represents a servo spoke location of the head, $A_2$ represents amplitude of pole-tip-protrusion over an operable range of heating by the heater element, $\alpha_2$ represents a gain factor, and $\tau_3$ and $\tau_4$ are time constants indicative of rate of change of pole-tip-protrusion in response to a heater signal applied to the heater element.

3. A method of controlling head fly height comprising:
estimating fly height clearance between a head and a data storage disk in response to heater signal levels applied to a heater element to heat the head;

generating a repository of calibrated fly height values for a range of heater signal levels applied to the heater element to heat the head and at a plurality of radial locations across the disk, wherein the fly height is estimated in response to the repository of calibrated fly height values, a present level of the heater signal applied to the heater element, and a radial location on the disk where data is to be written/read by the head; and regulating heating of the head by the heater element in response to the estimated fly height.

4. A method of controlling head fly height comprising:

estimating fly height clearance between a head and a data storage media in response to heater signal levels applied to a heater element to heat the head;

regulating the heater signal to increase heating by the heater element in response to the estimated fly height exceeding an upper target threshold;

regulating the heater signal to decrease heating by the heater element in response to the estimated fly height being less than a lower target threshold;

inhibiting writing and/or reading through the head in response to the estimated fly height being less than a lower operational threshold; and inhibiting writing through the head in response to the estimated fly height being greater than an upper operational threshold.

5. The method of claim 4, wherein writing is inhibited in response to a first lower operational threshold and reading is inhibited in response to a second lower operational threshold that is different than the first lower operational threshold.

6. A method of controlling head fly height comprising:

estimating fly height clearance between a head and a data storage media in response to heater signal levels applied to a heater element to heat the head;

in response to selection of a head for reading/writing on the media, regulating a heater signal to increase heating by the heater element until the estimated fly height is less than an upper target threshold; and enabling writing of data through the head onto the media in response to the estimated fly height becoming less than a write gate upper limit.

7. A method of controlling head fly height comprising:

estimating fly height clearance between a head and a data storage media by measuring duty cycle of writing of a data segment on the media, decreasing the fly height estimate in response to increased duty cycle, and increasing the fly height estimate in response to decreased duty cycle; and regulating heating of the head by a heater element in response to the estimated fly height.

8. The method of claim 7, wherein the fly height is estimated in response to length of a data segment that is about to be written through the head.

9. A circuit comprising:

a fly height controller that estimates fly height clearance between a head and a data storage media in response to a present heater signal level applied to a heater element to heat the head, a present air temperature, and a repository of calibrated fly height values for a range of heater signal levels and for a range of ambient air temperatures, and that regulates heating of the head by the heater element in response to the estimated fly height.

10. The circuit of claim 9, wherein the fly height controller estimates fly height based on a combination of an estimate of head fly height at a sensed air temperature, an estimate of head pole-tip-protrusion from head heating from writing data, and an estimate of head pole-tip-protrusion from head heating by the heater element.

* * * * *